(12) United States Patent
Buse

(10) Patent No.: US 9,415,949 B2
(45) Date of Patent: Aug. 16, 2016

(54) APPARATUS AND METHOD FOR EMPTYING A LOAD CARRIER LOADED WITH ARTICLES

(71) Applicant: Heinz Buse, Bad Zwischnahne (DE)

(72) Inventor: Heinz Buse, Bad Zwischnahne (DE)

( * ) Notice: Subject to any disclaimer, the term of this patent is extended or adjusted under 35 U.S.C. 154(b) by 0 days.

(21) Appl. No.: 14/364,166

(22) PCT Filed: Nov. 28, 2012

(86) PCT No.: PCT/EP2012/073837
§ 371 (c)(1),
(2) Date: Jun. 10, 2014

(87) PCT Pub. No.: WO2013/087413
PCT Pub. Date: Jun. 20, 2013

(65) Prior Publication Data
US 2014/0367224 A1  Dec. 18, 2014

(30) Foreign Application Priority Data

Dec. 16, 2011 (DE) .......................... 10 2011 088 821
Jan. 26, 2012 (DE) .......................... 10 2012 201 149
May 18, 2012 (DE) .......................... 10 2012 208 385

(51) Int. Cl.
*B65G 37/00* (2006.01)
*B65G 47/52* (2006.01)
(Continued)

(52) U.S. Cl.
CPC ................ *B65G 47/52* (2013.01); *B65B 69/00* (2013.01); *B65G 47/06* (2013.01); *B65G 47/904* (2013.01); *B65G 65/23* (2013.01); *B65G 65/36* (2013.01)

(58) Field of Classification Search
CPC ......... B65G 65/23; B65G 65/36; B65G 59/08
USPC .......................................................... 198/597
See application file for complete search history.

(56) References Cited

U.S. PATENT DOCUMENTS 2,127,007 A    8/1938  Paxton
2,307,194 A *  1/1943  Benning .................... 221/82
(Continued)

FOREIGN PATENT DOCUMENTS

EP         0968942 A1    1/2000
JP      19780017857 B2    8/1979

OTHER PUBLICATIONS

European Patent Office, Search Report issued in International Application No. PCT/EP2012/073837 dated Mar. 20, 2013.
(Continued)

*Primary Examiner* — William R Harp
(74) *Attorney, Agent, or Firm* — Wood, Herron & Evans, LLP

(57) ABSTRACT

Apparatus and methods for emptying a load carrier loaded with articles, in particular in the form of packages, which has a lateral outlet opening for removal of the articles. The apparatus includes a mount for the load carrier, a conveyor for carrying the articles away, and a conveyor ramp arranged upstream of the conveyor. The conveyor ramp and lateral outlet opening of the load carrier can be brought into contact with each other. The mount and conveyor ramp are pivotable into a position which is inclined with respect to the horizontal and in which the conveyor ramp is in contact with the lateral outlet opening of the load carrier. The mount and conveyor ramp are moveable relative to each other in the inclined position in such a way that the mount and the conveyor are moved toward each other.

18 Claims, 11 Drawing Sheets

(51) Int. Cl.
   *B65B 69/00*    (2006.01)
   *B65G 47/06*    (2006.01)
   *B65G 47/90*    (2006.01)
   *B65G 65/23*    (2006.01)
   *B65G 65/36*    (2006.01)

(56) References Cited

U.S. PATENT DOCUMENTS

| | | | |
|---|---|---|---|
| 2,735,561 A | | 2/1956 | Van Doren |
| 3,279,580 A | * | 10/1966 | Englander et al. ............ 198/452 |
| 3,279,635 A | * | 10/1966 | Avery et al. .................... 414/420 |
| 3,401,811 A | * | 9/1968 | Grasvoll .................... 414/796.6 |
| 3,616,951 A | | 11/1971 | St. Clari et al. |
| 3,651,967 A | * | 3/1972 | Rooke et al. ................... 414/414 |
| 3,767,073 A | | 10/1973 | DeGreef |
| 4,042,234 A | * | 8/1977 | Tokuno .......................... 271/151 |
| 4,106,635 A | * | 8/1978 | Nishimura ................. 414/796.3 |
| 4,234,279 A | * | 11/1980 | Lotti .......................... 414/788.5 |
| 4,710,089 A | * | 12/1987 | Schneider ................. 414/795.7 |
| 4,776,742 A | * | 10/1988 | Felder ........................ 414/796.7 |
| 4,802,810 A | * | 2/1989 | Gunn ............................ 414/414 |
| 7,278,814 B2 | * | 10/2007 | Benedetti ..................... 414/420 |
| 2001/0012482 A1 | * | 8/2001 | Vezina ......................... 414/419 |

OTHER PUBLICATIONS

German Patent Office, Office Action issued in application No. 10 2012 208 385.5 dated May 15, 2014.

* cited by examiner

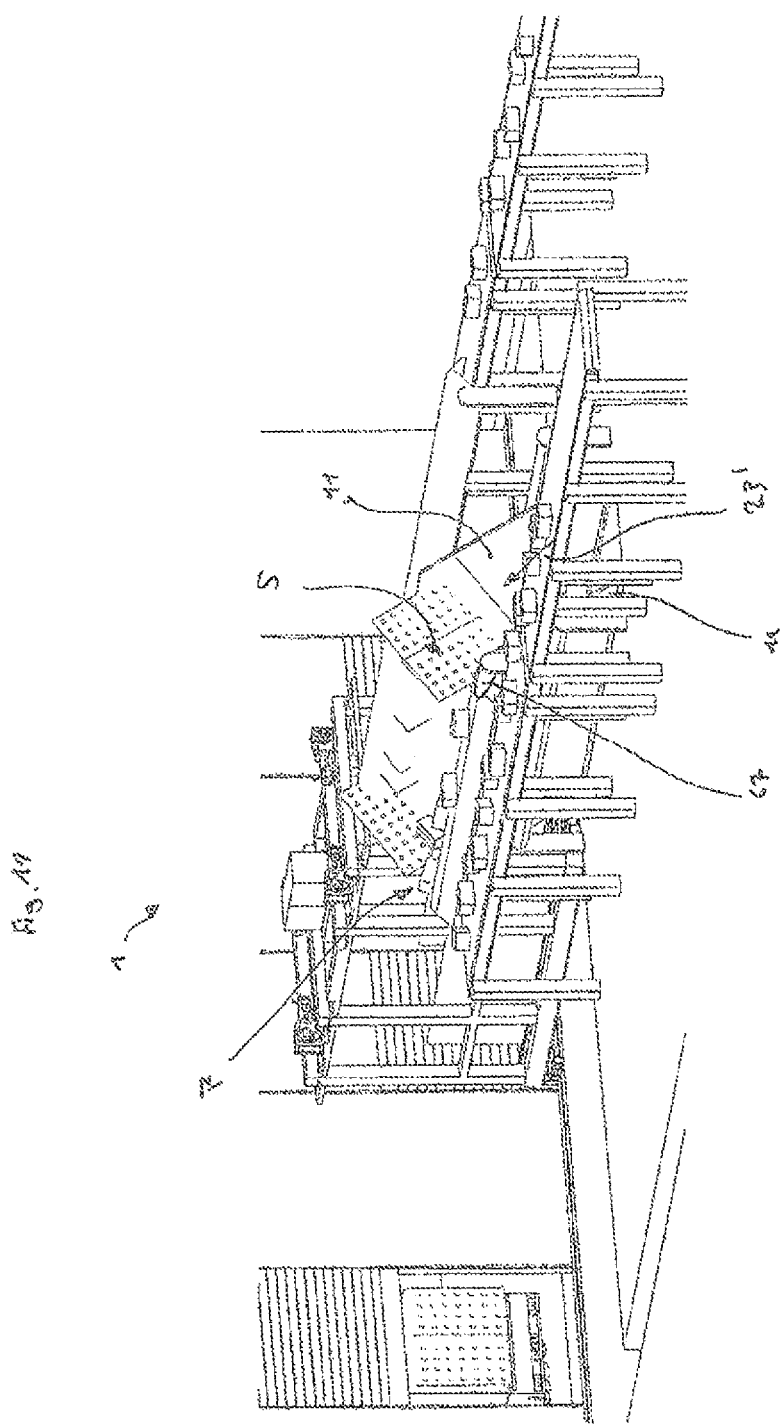

APPARATUS AND METHOD FOR EMPTYING A LOAD CARRIER LOADED WITH ARTICLES

BACKGROUND

The present invention concerns an apparatus for emptying a load carrier loaded with articles, in particular in the form of packages, which has a lateral outlet opening for removal of the articles, comprising a mount for the load carrier, and a conveyor for carrying the articles away.

The invention further concerns a method of emptying a load carrier loaded with articles, in particular in the form of packages, which has a lateral outlet opening for removal of the articles.

Apparatuses and methods of the above-indicated kind are used, in particular, in logistics centers in which cargo articles are transloaded. In particular, package centers of logistics service providers are to be named as an example. In such organizations, a large number of load carriers are supplied and provided by means of vehicles, for example trucks or trains, for transloading the articles, in particular for transloading packages. In that respect transport, systems are known, which provide for the use of load carriers in the form of containers or swap bodies, as well as other systems, for example those of the present applicant, which use specifically designed load carriers which are transported within the trucks, containers, swap bodies, train wagons or other vehicles, and the dimensions of which are substantially adapted to the internal load dimensions of such vehicles. To ensure smooth and efficient operation of such logistics systems, it is of central significance that the supplied load carriers are freed of the loaded articles in a short time and, at the same time, damage to the articles is avoided to the greatest possible extent.

Unloading of the load carriers is typically effected manually or by means of especially designed transfer stations, which permit removal of the articles in individually separated fashion. What is common to those known methods of emptying load carriers is that they either require a high level of personnel involvement or, in any event, they require a large amount of time, which limits efficient operation.

Previous attempts to provide apparatuses for emptying a load carrier loaded with articles, which permit faster emptying of the load carrier, were confronted with the challenge that each load carrier is packed differently and sometimes non-homogenously. Articles of differing sizes and differing formats are, in the best-case scenario, arranged partly systematically in the known load carriers because loading of the load carriers is effected in other logistics centers after the articles are received and generally no preliminary sorting is possible. Expedited emptying of load carriers which are packed in that way, for example in the form of bulk cargo, has hitherto inevitably resulted in high defect rates.

SUMMARY

Consequently, an object of the invention is to provide an apparatus and a method of the kind set forth in the opening part of this specification, which permit faster emptying of the load carrier loaded with articles and which at the same time avoid damage to the articles to the best possible extent.

In an apparatus of the kind set forth in the opening part of this specification, the object of the invention is attained in that the apparatus has a conveyor ramp arranged upstream of the conveyor, wherein the conveyor ramp and the lateral outlet opening of the load carrier can be brought into contact with each other, the mount and the conveyor ramp are pivotable into a position which is inclined with respect to the horizontal and in which the conveyor ramp is in contact with the lateral outlet opening of the load carrier, and the mount and the conveyor ramp which is in contact with the load carrier are moveable relative to each other in the inclined position in such a way that the mount and the conveyor are moved toward each other. In that case, the mount is preferably disposed at least at times in a region near the ground and the conveyor for carrying the articles away is disposed in height-displaced relationship above the mount for the load carrier.

The embodiments of the invention make use of the realization that, when emptying a load carrier in the inclined position, by virtue of the loading due to weight involved with the large number of loaded articles, damage to the lower articles primarily occurs within the load carrier. As soon as a plurality of articles which are disposed one upon the other are moved, load peaks and damage to the articles that are disposed underneath occurs by virtue of multi-axis stress conditions and slight tipping of the articles that are disposed one above the other. It is here that the embodiments of the invention come in, insofar as admittedly it implements emptying of a load carrier in a pouring-like movement, thereby ensuring a high working speed, but in contrast to known approaches, it permits emptying of the load carrier in such a way that the upwardly disposed articles are removed first, whereby it is possible to very substantially avoid those load peaks causing damage to the underneath articles. That is ensured, in particular, by the interaction of the lateral outlet opening of the load carrier with the conveyor ramp.

The apparatus according to an embodiment of the invention is preferably adapted to bring the conveyor ramp and the lateral outlet opening of the load carrier into engagement with each other when the load carrier is still standing upright, and the articles are therefore still in an orientation appropriate to transport. Preferably, the conveyor ramp and the lateral outlet opening of the load carrier are brought into contact by the conveyor ramp being pivotable into a vertical position. Further preferably, the mount and the conveyor ramp are pivotable jointly into a position of being inclined relative to the horizontal. In that respect, inclining of the load carrier on the mount is preferably ensured when there is already contact with the conveyor ramp. The articles can thus be moved into the inclined position without dislocation shifts or so-called migratory movements of the articles occurring within the load carrier. Because the apparatus is designed to produce the relative movement between the mount and the conveyor ramp in the above-described manner, an upper part of the lateral outlet opening is cleared in the movement of the conveyor ramp and the mount relative to each other in an (upper) region in the proximity of the conveyor for the discharge of the articles. In that way, the apparatus is adapted to firstly discharge the upwardly disposed articles out of the load carrier through the opened gap in the lateral outlet opening towards the conveyor. In that way, progressively further layers of the articles are moved in the load carrier from the top downwardly out of the part of the lateral outlet opening towards the conveyor, by virtue of the inclined position of the load carrier in the mount—until the load carrier is completely emptied. The statically implemented storage of the lower articles, which are subjected to the higher loading, is constantly maintained by virtue of the unchanged angular arrangement of the load carrier relative to the conveyor ramp, which has been brought into contact therewith, during the unloading operation. In comparison with known unloading processes, that system permits a marked increase in the operating speed with at the same time no damage rate or an only moderately rising damage rate in respect of the articles, in comparison with manual emptying.

Preferably, the above-described conveyor ramp is a first conveyor ramp, the above-described mount for the load carrier is a first mount, and the apparatus further has a second mount for the load carrier and a second conveyor ramp arranged upstream of the conveyor, wherein the second conveyor ramp and the lateral outlet opening of the load carrier can be brought into contact with each other, the second mount and the second conveyor ramp are pivotable into a position which is inclined relative to the horizontal and in which the second conveyor ramp is in contact with the lateral outlet opening of the load carrier, and the second mount and the second conveyor ramp which is in contact with the load carrier are moveable relative to each other in the inclined position in such a way that the second mount and the conveyor are moved toward each other. The configuration of the apparatus according to the embodiment of the invention with a first and a second mount, and with a first and a second conveyor ramp which are respectively associated with the common conveyor for carrying the articles away, achieves an increase in conveyor capacities, while at the same time optimized apparatus expenditure. In accordance with this embodiment of the invention, there is no need for a second conveyor belt also to be set up, with the function of the conveyor for carrying the articles away, because both conveyor ramps cooperate with the same conveyor.

In a further preferred embodiment of the invention which is optimized in particular for a load carrier that has a second lateral outlet opening in opposite relationship with the first lateral outlet opening, the conveyor ramp is a first conveyor ramp, the conveyor is a first conveyor, and the apparatus further has a second conveyor for carrying the articles away and a second conveyor ramp arranged upstream of the second conveyor, wherein the second conveyor ramp and the second lateral outlet opening of the load carrier can be brought into contact with each other, the mount and the second conveyor ramp are pivotable into a position which is inclined relative to the horizontal and in which the second conveyor ramp is in contact with the second lateral outlet opening of the load carrier, and the mount and the second conveyor ramp which is in contact with the load carrier are moveable relative to each other in the inclined position in such a way that the mount and the second conveyor are moved toward each other. Unlike the above-described preferred embodiment, in this alternative therefore a single mount is provided to supply two conveyor ramps and two conveyors with articles from a load carrier that can be opened towards both sides.

Preferably, in that case, the mount is arranged between the first conveyor ramp and second conveyor ramp, and the mount is pivotable selectively in the direction of the first or second conveyor ramp. In that way, it is possible to change between a first direction of inclination of the mount in contact with a respective conveyor ramp to a second direction of inclination in contact with the respective other conveyor ramp. Such a change movement is particularly advantageous, in particular, when it is detected that, when unloading the articles from the load carrier, in the upper region in front of the opening there is an accumulation of articles, which is to be attributed for example to a plurality of articles becoming wedged and jammed. The articles that are further away from the outlet opening are prevented from moving towards the conveyor by generally larger articles that are further in front. In such a situation, it is particularly advantageous that the mount can be moved back into the non-inclined starting position and can then be inclined in the direction of the other conveyor ramp whereby the articles which are then at the front can then be discharged without impediment.

An advantageous embodiment of the apparatus according to the invention provides that the first and/or second mount is moveable by means of a drive unit in the inclined position along the conveyor ramp. In that case, the apparatus is designed for transporting the mount with load carrier thereon upwardly along the inclined conveyor ramp. The drive for the mount upwardly along the conveyor ramp is preferably afforded by means of hydraulic or pneumatic drive means, or by means of a gear and/or rail system.

By means of a further preferred embodiment of the apparatus according to the invention, the first and/or second conveyor ramp is moveable by means of a drive unit along the lateral outlet opening of the load carrier. In that case, the conveyor ramp is adapted to be moveable. That is preferably effected by means of a sliding guide, by means of which the conveyor ramp is displaceable along the first and/or second mount and the load carrier which is disposed in the inclined position, or by means of a rolling movement of the first and/or second conveyor ramp on the surface of the load carrier with the lateral outlet opening.

Preferably, the first and/or second conveyor ramp is in the form of a conveyor and is driveable substantially synchronously with the movement relative to the first and/or second mount. That applies preferably for one of the two above-described embodiments or for a combination of the two above-described embodiments. With the mount with load carrier in a stationary inclined position, this embodiment provides that the conveyor ramp rolls like a belt downwardly (with respect to the relative position of the mount and the load carrier) along the surface with the lateral outlet opening of the load carrier, whereby the conveyor moves downwardly together with the ramp along the surface having the lateral outlet opening and is moved towards the load carrier. In that embodiment which provides an upward movement of the load carrier along the ramp, it is also possible for the conveyor ramp to be displaced in the manner of a conveyor at the same speed and in the same direction relative to the conveyor movement of the mount and the load carrier in the direction of the conveyor for discharge of the articles. In that way, the articles which are in contact with the conveyor ramp at the lateral outlet opening of the load carrier are not exposed to any shearing loading. That additionally results in the potential for damage to the articles being limited.

In a further preferred embodiment of the invention, the apparatus has a collecting rocker which is arranged between the first and/or second conveyor ramp and the conveyor for carrying the articles away and which is reciprocatable between a preferably horizontal collecting position and a—preferably inclined—release position. Articles issuing from the load carrier through the opened section of the lateral outlet opening are firstly received on the collecting rocker, and it is only when a predetermined amount of articles is reached on the collecting rocker that the articles are passed to the conveyor for discharge thereof by movement of the collecting rocker into the release position. The amount of articles occurring on the collecting rocker can preferably be established by means of a monitoring device. Therefore, such a monitoring device has optical detection means for example in the form of cameras and means for electronic image processing. Preferably, the collecting rocker is additionally in the form of a conveyor belt so that the conveyor belt moves in the release position in the direction of the conveyor for carrying the articles away.

In a further advantageous configuration, the first and/or second mount is adapted for transport of the load carrier in a horizontal plane to an abutment point and can be coupled to the first and/or second conveyor ramp upon attainment of the abutment point. This embodiment is particularly advantageous if the location of delivery of the load carriers is not in the immediate proximity of the location of the conveyor ramp. In that case, the mount is adapted to take over the load carrier at a first location, transport it in a substantially horizontal plane to an abutment point, and there to be coupled to the conveyor ramp. Optionally, the mount is also displaceable substantially along a vertical axis for bridging over any differences in height on the path of transport of the load carrier from the first location to the (second) location of the conveyor ramp.

In an alternative embodiment of the invention, the first and/or second mount is fixedly connected to a displaceable portion of the first and/or second conveyor ramp. That solution is to be preferred, in particular, when transport of the load carrier towards the mount is to be ensured in another fashion. The fixed connection of the mount to a displaceable portion of the conveyor ramp provides that only a common drive means is required for simultaneous and joint movement of the conveyor ramp and the mount.

It is further preferred if the load carrier is adapted for use in a logistics system in order to be transferred on to the load surface of a vehicle and/or to be taken from a vehicle, wherein the load carrier is substantially of dimensions adapted to the load surface of the vehicle. Such load carriers are known inter alia from the present applicant and are to be obtained therefrom.

Preferably, the conveyor for carrying the articles away has one or more conveyor belts. Alternatively or additionally, the conveyor for carrying the articles away has one or more conveyor chutes. Further preferably, the conveyor for carrying the articles away has means for slowing the articles down as they are carried away. The means for slowing the articles being carried away down are adapted in particular to brake or damp the "travel" of the articles taken from the load carrier along a conveyor path defined by the conveyor for carrying the articles away. That is ensured, for example, by means of conventional damping elements or a multiplicity of conveyors involving different conveyor speeds.

Further preferably, the conveyor for carrying the articles away is adjustable in height and/or angle, preferably adapted to a displacement movement of the first and/or second conveyor ramp. The conveyor is preferably arranged at the upper end of the conveyor ramp so that only a distance of the smallest possible extent has to be covered by the articles in sliding relationship between the portion which becomes clear (or the opened section) of the lateral outlet opening and the conveyor itself. Particularly, in those embodiments in which the conveyor ramp is displaced to ensure that the mount or the load carrier and the conveyor for carrying the articles away move towards each other, the conveyor is preferably also moved synchronously.

In a further preferred development of the invention, the apparatus has a shaker device. The shaker device is adapted to produce vibrations in the load carrier and/or vibrations of the conveyor ramp. The shaker device is optionally adapted to produce vibrations of the first and/or second mount, the load carrier, and/or the first and/or second conveyor ramp. That provides that the articles are caused to move in the load carrier, thereby making it easier for them to slide out of the (upper) opening portion of the lateral outlet opening in the inclined position of the load carrier or the mount in contact with the conveyor ramp. Particularly in the case of load carriers which are packed in non-homogenous fashion and in which larger packages are arranged in a region in the proximity of the lateral outlet opening, with smaller packages being disposed beside the larger packages, the larger packages cause a "bottleneck" which then when the larger articles become free leads to sudden issue of a large number of (also smaller) articles. The production of vibration by means of the shaker device makes it possible for the smaller articles which are behind potentially larger articles to move past those larger articles. In that way, detrimental article bottlenecks and a tumbling movement of the smaller articles which are further back as they fall out are prevented or at any event restrained. That in turn leads to a reduction in article damage.

In a further preferred embodiment, arranged between the first and/or second conveyor ramp and the conveyor for carrying the articles away is a conveyor roller for transferring the articles from the load carrier in the direction of the conveyor. Alternatively or additionally, preferably arranged between the first and/or second conveyor ramp and the conveyor for carrying the articles away is a conveyor belt for transferring the articles from the load carrier in the direction of the conveyor. The preferred embodiments with a conveyor roller or a conveyor belt make use of the further advantage that in particular large-size articles that pass the lateral outlet opening, which becomes clear between the conveyor ramp and the load carrier, can be deflected by means of the deflection roller better, that is to say at the same time more quickly and more gently, in the direction of the conveyor for carrying the articles away. That is advantageous, in particular, when smaller articles are disposed in the interior of the load carrier behind the large-size articles, and those smaller articles are prevented from issuing from the load carrier by the larger articles. Accordingly, an article bottleneck is reduced or, in the best-case scenario, prevented by means of the conveyor roller and/or the conveyor belt for transferring the articles from the load carrier in the direction of the conveyor. The embodiment in which a conveyor belt is used for transferring the articles is preferably of such a configuration that the conveyor belt is arranged to circulate around two rollers, wherein a first roller serves as a drive means and a second roller serves as a direction-changing roller. Further preferably, the first and/or the second roller are adjustable in height in such a way that the angle of inclination of a top side of the conveyor belt, usually the transport side or the side towards the articles, is adjustable. Further preferably, the rollers are of differing diameters, wherein particularly preferably the roller that is closer to the conveyor ramp is of a larger diameter than the roller that is closer to the conveyor for carrying the articles away. That gives the advantage that the larger diameter, which is near the conveyor ramp, provides for a gentle change in direction while the smaller diameter, which is towards the conveyor for carrying the articles away, permits a smaller gap size at that location.

Preferably, the conveyor roller or the conveyor belt is drivable at a higher speed than the relative speed between the first and/or second mount and the first and/or second conveyor ramp. As an alternative to a drive at the same speed, accelerated driving of the conveyor roller or the conveyor belt is particularly preferred because in that way the articles in the proximity of the conveyor roller or the conveyor belt are accelerated out of the interior of the load carrier, being so-to-speak "pulled along". That improves removal of the articles overall and additionally minimizes the risk of articles becoming jammed in the region of the opening of the load carrier.

That manner of driving the roller or the conveyor belt is particularly preferred if the conveyor belt or the roller are so angled that the articles are not conveyed out of the load carrier at a right angle or even at a still more acute angle, but are conveyed at an obtuse angle or with a transition which is as gentle as possible.

In a further preferred embodiment, the apparatus according to an embodiment of the invention has one or more guide plates arranged above the conveyor for discharge of the articles and adapted to deflect the articles fed to the conveyor in the conveyor direction. Preferably, the guide plate or plates is or are arranged centrally over the conveyor belt. Preferably then, one-half of the belt width for the articles to be respectively discharged is associated with each conveyor ramp (when using a plurality of conveyor ramps). The occurrence of package bottlenecks on the conveyor for carrying the articles away is thereby further checked because a given region of the conveyor belt can be associated with each conveyor ramp and the speed of the conveyor belt is appropriately adjustable.

The object of the invention is attained in a method of the kind set forth in the opening part of this specification, in particular using an apparatus as described hereinabove, comprising the steps: providing the load carrier in a mount, bringing a conveyor ramp and the lateral outlet opening of the load carrier into contact with each other, pivoting the mount and the conveyor ramp into a position which is inclined relative to the horizontal and in which the conveyor ramp is in contact with the lateral outlet opening of the load carrier, moving the mount and the conveyor ramp which is in contact with the load carrier relative to each other in the inclined position in such a way that the mount and the conveyor are moved towards each other, and discharging the articles from the load carrier, which articles pass as a consequence of the relative movement through the outlet opening which becomes free, with a conveyor.

Preferably, the mount and the conveyor ramp are pivoted jointly into a position of being inclined relative to the horizontal. In that case, the conveyor ramp is preferably brought into contact with the lateral outlet opening of the load carrier, in particular being pivoted into a vertical position. Optionally, that is already effected before the mount receives the load carrier. In the case of such a procedure, contact between the conveyor ramp and the lateral outlet opening of the load carrier with each other is already made when the load carrier has reached its definitive position at or on the mount.

An advantageous embodiment of the method according to the invention provides that the mount is displaceable by means of a drive unit in the inclined position along the conveyor ramp and/or conveyor ramp is displaced by means of a drive unit along the lateral outlet opening of the load carrier.

Further preferably, the method according to an embodiment of the invention includes one, more or all of the steps: driving the conveyor ramp substantially synchronously with the movement relative to the mount, reciprocating a collecting rocker arranged between the conveyor ramp and the conveyor for carrying the articles away between a preferably horizontal collecting position and preferably inclined release position, transporting the load carrier in a horizontal plane to an abutment point and coupling to the conveyor ramp upon attainment of the abutment point, slowing down the articles being carried away, and/or adjusting the height and/or the angle of the conveyor for carrying the articles away, preferably adapted to a displacement movement of the conveyor ramp, and/or carrying the articles away by means of a conveyor roller (63) arranged between the first and/or second conveyor ramp and the conveyor and/or by means of a conveyor belt (67) for transferring the articles from the load carrier in the direction of the conveyor, and/or driving the conveyor roller (63) and/or the conveyor belt (67) at the same or a higher speed than the relative speed between the first and/or second mount and the first and/or second conveyor ramp.

A preferable embodiment of the method according to the invention comprises the steps: lowering the raised mount which is in contact with the first or second conveyor ramp and which is inclined relative to the horizontal if wedging of articles is detected, bringing the other conveyor ramp and the other lateral outlet opening of the load carrier into contact with each other, pivoting the mount into an opposite position of being inclined relative to the horizontal, and again raising the mount relative to the conveyor ramp which is now in contact.

BRIEF DESCRIPTION OF THE SEVERAL VIEWS OF THE DRAWINGS

The invention is described in greater detail hereinafter by means of preferred embodiments by way of example and with reference to the accompanying Figures.

FIG. 11 shows a further perspective view of the apparatus according to the third embodiment.

For all three embodiments described in detail, identical references are used for elements which are identical or which are similar in terms of function. In that respect in regard to those references in the absence of an explicit mention thereof in the text, attention is expressly directed to the respective Figures.

Although certain features are described and illustrated only in relation to one of the three embodiments by way of example, it is understood and assumed that the features can each also be combined with the configuration of the respective other embodiment in manifest manner.

DETAILED DESCRIPTION

Figure 1:
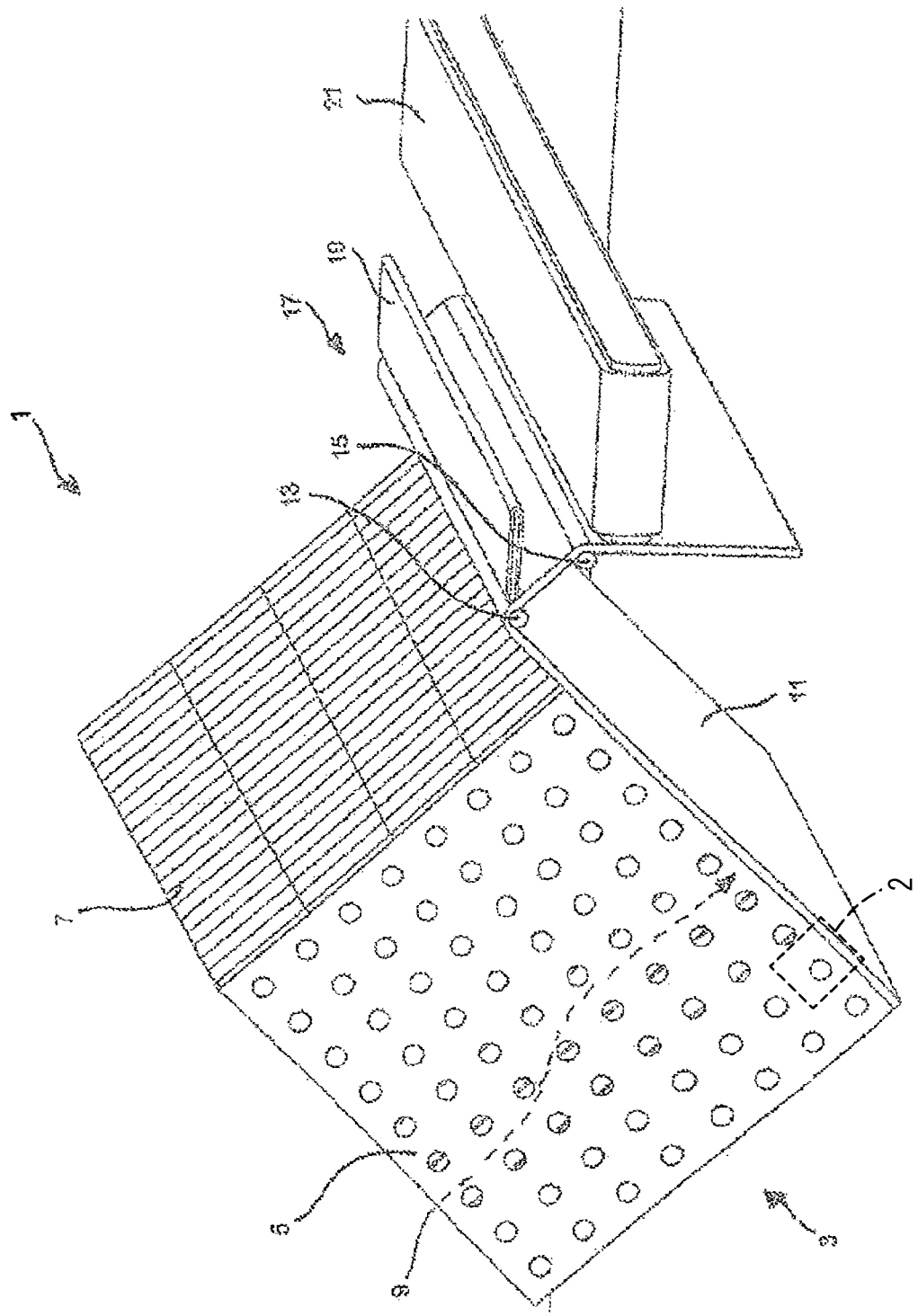
FIG. 1 shows a perspective view illustrating the principle of an apparatus according to the invention in a first embodiment.

An apparatus for emptying a load carrier loaded with articles, in particular in the form of packages, which has a lateral outlet opening for removal of the articles, is shown in FIGS. 1 to 4 for a first embodiment. The illustrated apparatus 1 has a lower region 3 in which a mount 2 (shown schematically) for a load carrier 5 is disposed. FIG. 5 shows an operative position of the apparatus 1, in which the load carrier 5 is already disposed on the mount 2. The load carrier 5 is loaded with a multiplicity of articles in the form of packages 7. For the sake of simplicity of the drawing, the packages in FIG. 1 are indicated as items of identical size, although in a real-life load situation it is to be expected that the individual sizes of the packages markedly differ from each other. The load carrier 5 has a side having a lateral outlet opening 9 which is covered in the position shown in FIG. 1. The surface having the lateral outlet opening 9 is in contact with a conveyor ramp 11. The conveyor ramp 11 in the first embodiment is in the form of a conveyor belt. The conveyor ramp is driven in circulation by way of a first conveyor roller 13 and a second conveyor roller 15 and optionally further conveyor rollers (not shown). The mount 2 arranged in the region 3 and the load carrier 5 are disposed jointly with the conveyor ramp 11 in a position of being inclined relative to the horizontal so that the packages 7 arranged in the load carrier 5, by virtue of the force of gravity, are partly in contact with the conveyor ramp 11 and are pressed lightly against same. As the conveyor ramp 11 completely covers the lateral outlet opening 9 in the FIG. 1 position, no packages 7 can issue from the load carrier 5.

A collecting rocker 19 is disposed in the upper region 17 of the apparatus 1. The collecting rocker 19 is disposed downstream of at least the first roller 13. The collecting rocker 19 is adapted to firstly collect packages 7 issuing from the load carrier 5 in a collecting position (shown in FIG. 1) and, if required, optionally in an automated procedure or manually, to transfer them to a conveyor 21 for carrying the articles away, by pivotal movement of the collecting rocker 19 into a release position of being inclined relative to the horizontal. The conveyor 21 is in the form of a conveyor belt in the first embodiment. Optionally, adjoining the illustrated conveyor belt are further conveyor belts or conveyor means. In the illustrated embodiment, the collecting rocker is also in the form of a conveyor belt but, alternatively, it can also be in the form of a chute or an arrangement of a plurality of rollers.

Figure 2:
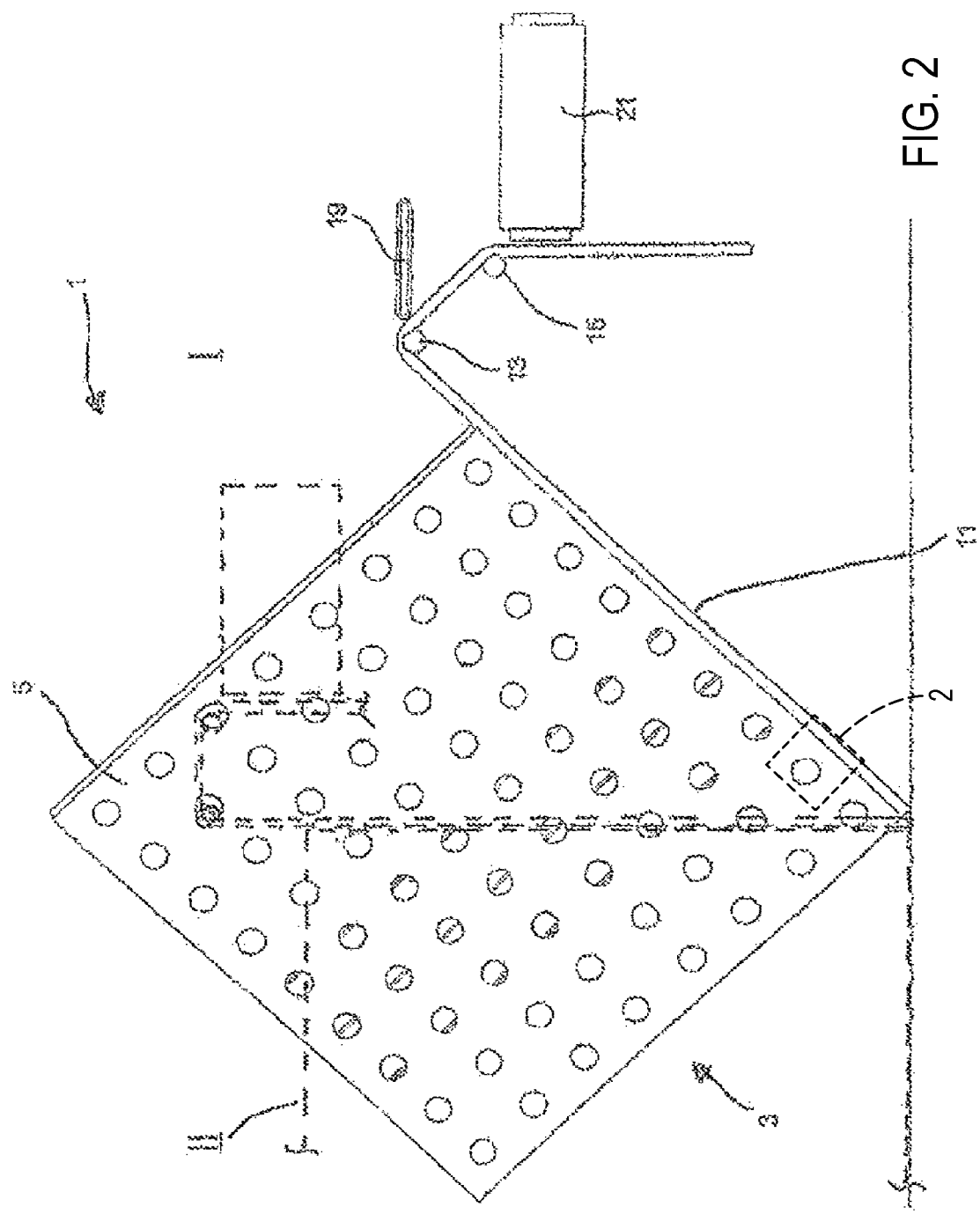
FIG. 2 shows a side view of the apparatus of FIG. 1.

FIG. 2 shows various operative positions of the apparatus 1 and the load carrier 5. As shown by the solid lines, the apparatus 1 inclusive of the mount 2 in the region 3 and the conveyor ramp 11 is in a position I of being inclined relative to the horizontal. The load carrier 5 and the apparatus 1 are reciprocatable in particular pivotable, between the illustrated position I and a position II indicated by dotted lines. That is effected optionally in conformity with each other when the load carrier is disposed on the mount 2 or is fixed thereto, or separately from each other when for example the load carrier 5 is not yet positioned on the mount 2 or the conveyor ramp is pivotable relative to the mount 2 and is still to be brought into contact with the load carrier 5 and its lateral outlet opening 9 (see FIG. 1).

Figure 3:
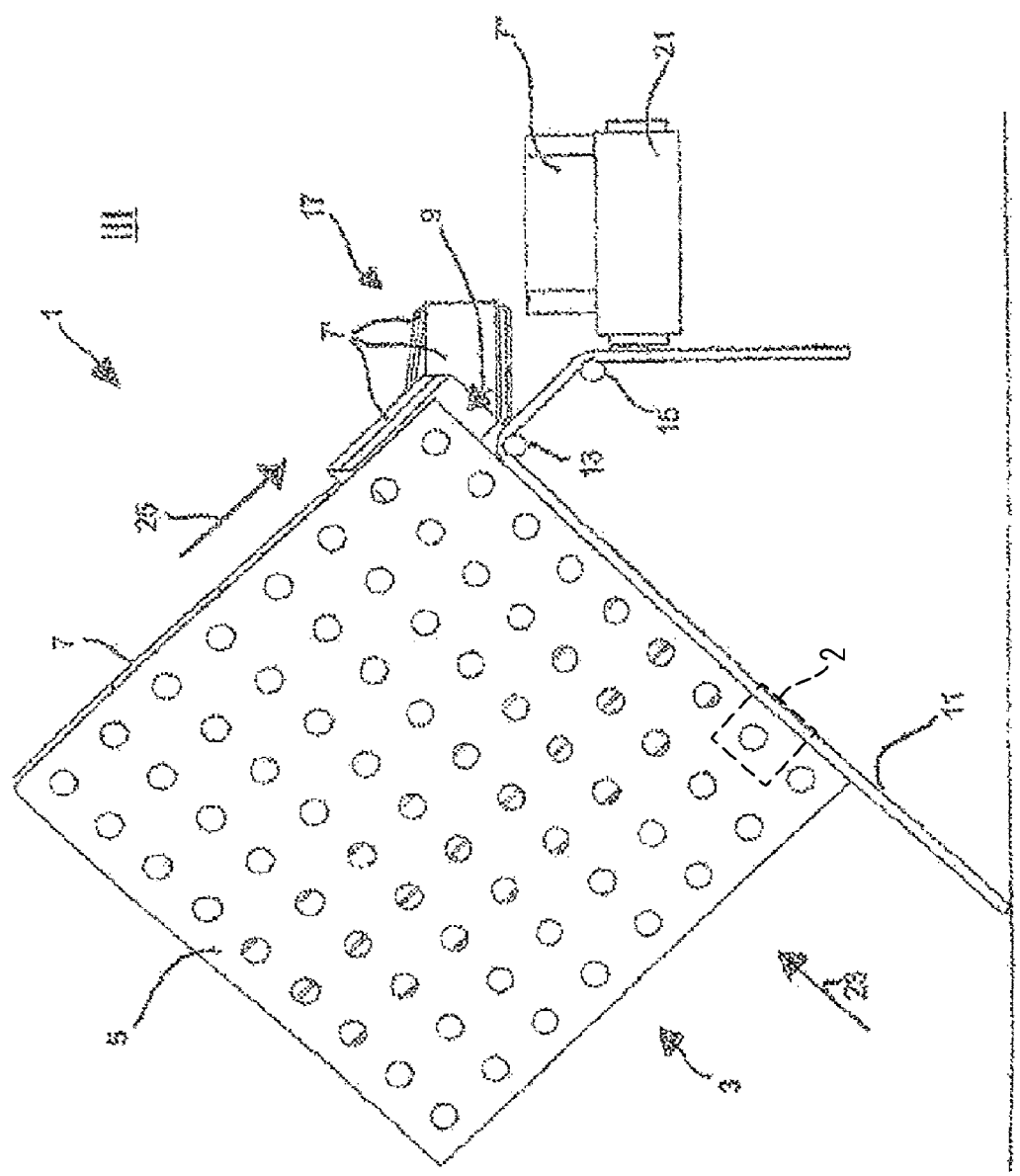
FIG. 3 shows a side view of the view in FIGS. 1 and 2 in an alternative operative position.
Figure 4:
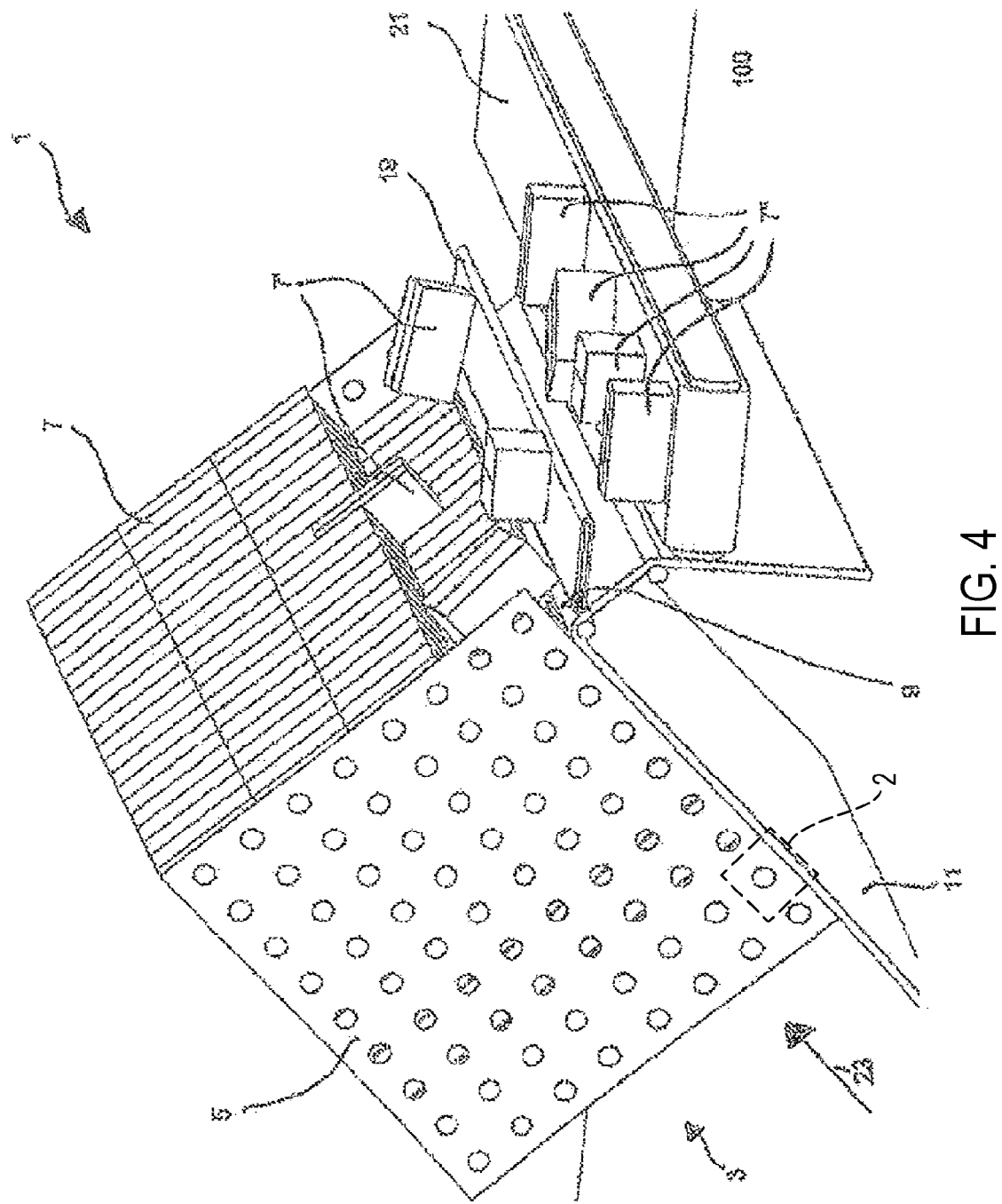
FIG. 4 shows a perspective view of the apparatus of FIGS. 1 to 3 in the position of FIG. 3.
Figure 5:
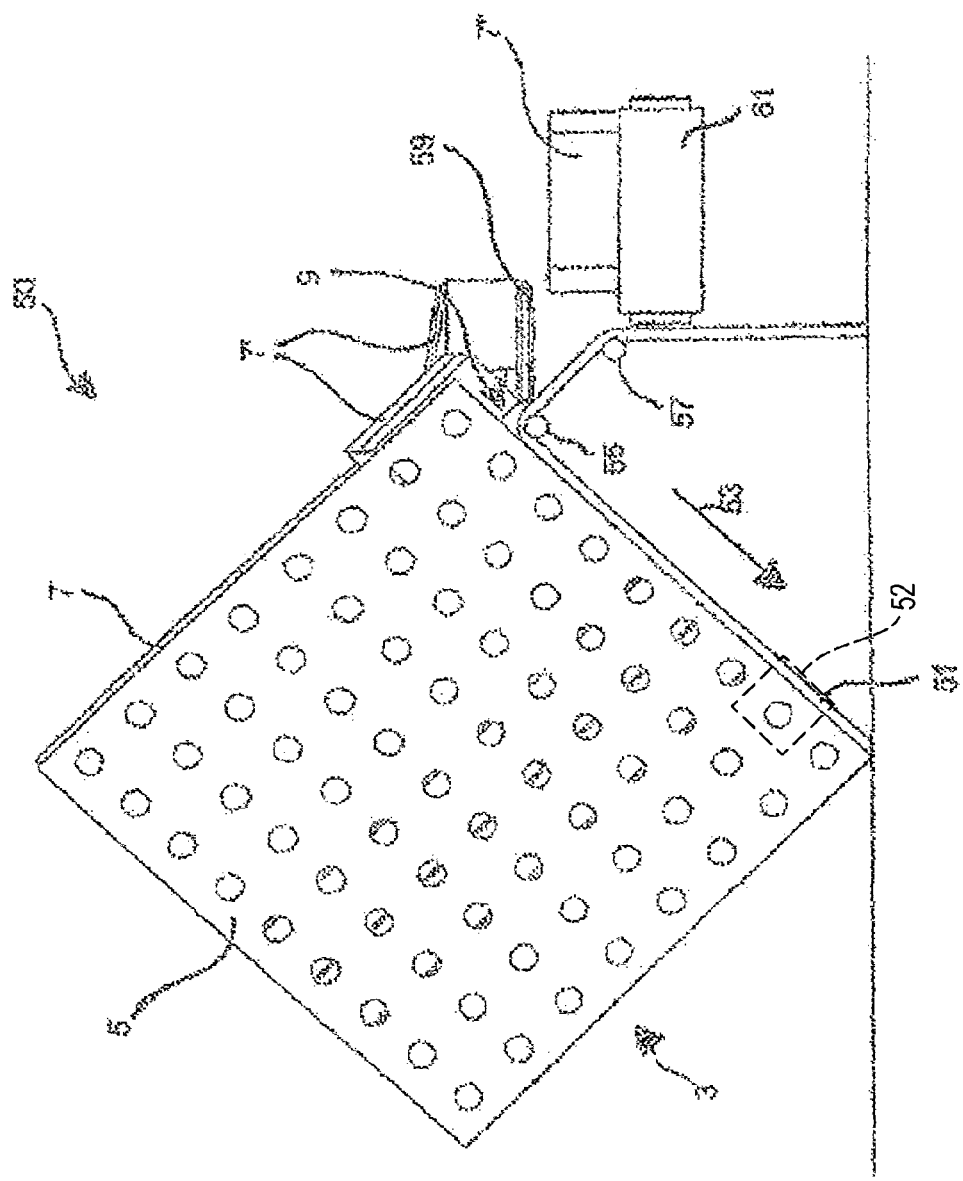
FIG. 5 shows a side view of an apparatus according to the present invention in a second embodiment.

The operative position of the apparatus 1, shown in FIGS. 3 and 4, corresponds to a third position III of the apparatus 1. In this position, the mount 2 is moved with the region 3 and the load carrier 5 relative to the conveyor ramp 11. In that way, in the illustrated first embodiment, the load carrier 5 has been moved away from a region of the ground 100 relative to the positions I and II (see FIG. 2), but in return is moved towards the upper region 17 of the apparatus 1, in which the collecting rocker and the conveyor 21 are disposed. The relative movement is implemented or assisted by the fact that the conveyor ramp 11 is in the form of a conveyor and rolls along the wall of the load carrier 5 with the lateral outlet opening 9. The height of the conveyor ramp 11 remains unchanged in that case, and the mount 2 and the load carrier 5 are conveyed upwardly at the same speed as the movement of the belt of the conveyor ramp 11. Due to the relative movement indicated in FIG. 3 in the direction of the arrow 23, the lateral outlet opening 9 is no longer completely in overlapping relationship with the conveyor ramp 11. A gap is opened in an upper region, that gap permitting packages 7 (as shown in the position 7') to pass through and out of the load carrier 5. The packages 7 are firstly collected in the position 7' by the collecting rocker and intermittently delivered to the conveyor 21 so that they encounter same at position 7" and are carried away.

Figure 6:
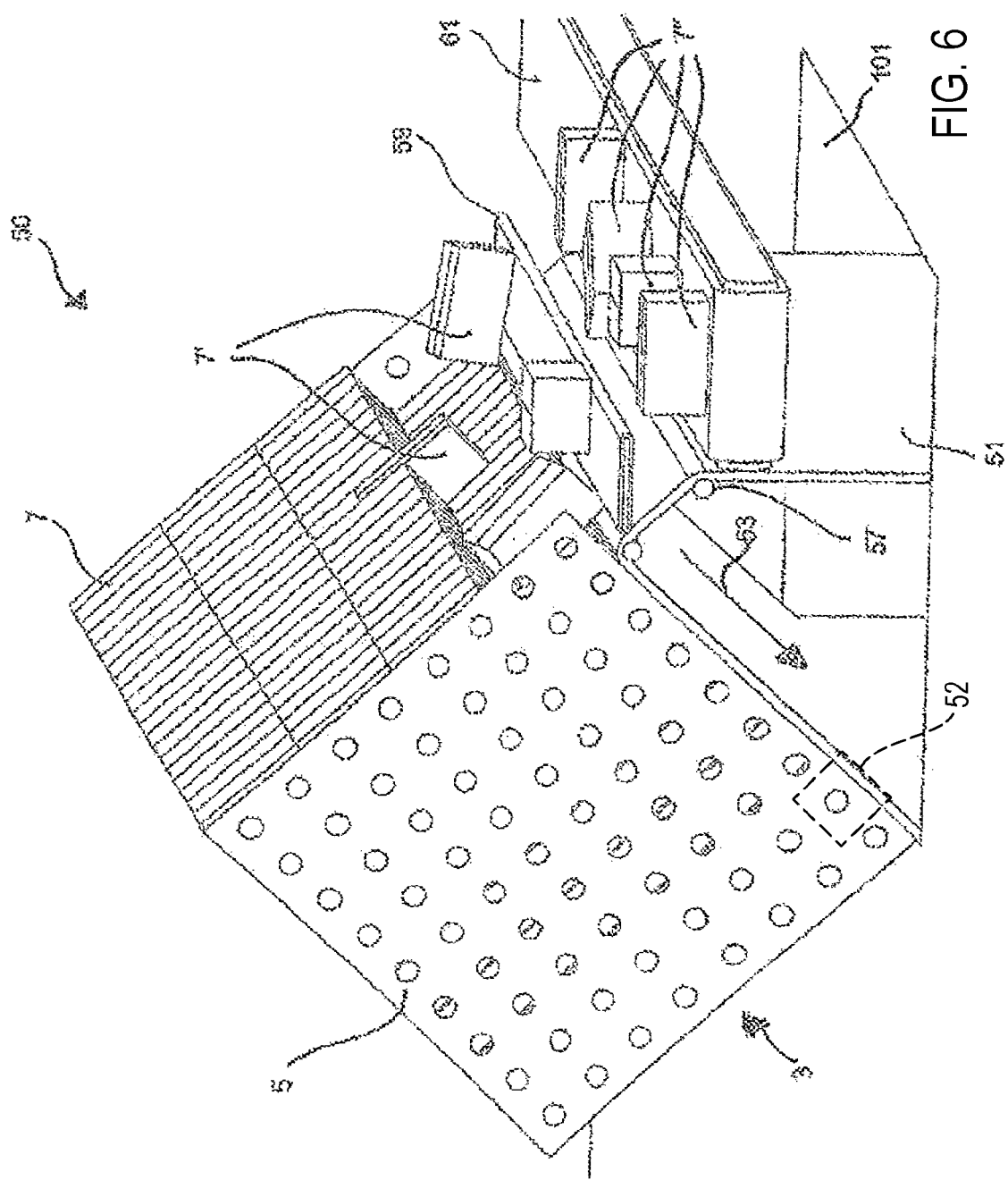
FIG. 6 shows a perspective view of the apparatus of FIG. 5.

FIGS. 5 and 6 show an apparatus 50 for emptying a load carrier 5 loaded with a articles in accordance with a second embodiment of the invention. The apparatus 50 is identical in essential structural components to the apparatus 1 of FIGS. 1 to 4. Therefore, attention is directed to the foregoing description in relation to the conforming references.

Unlike the apparatus 1 shown in FIGS. 1 to 4, a mount 52 (shown schematically) of apparatus 50 is admittedly reciprocatable, in particular pivotable, between a position I and a position II (see FIG. 2) in the region 3 with or without the load carrier 5, but it is not displaceable in respect of height. Implementation of a relative movement between the mount 52 and the conveyor ramp which is in contact with the load carrier (here identified as the conveyor ramp 51) is brought about by the conveyor ramp 51 being displaceable in the direction of the arrow 53. A collecting rocker 59 and a conveyor 61 for carrying away the articles are moved downwardly by that displacement travel. As a result, the overlap of the lateral outlet opening 9 of the load carrier 5 with the conveyor ramp 51 is gradually nullified, whereby a gap in respect of the lateral outlet opening 9 is opened, through which packages 7 can firstly pass into the position 7' and finally can issue into position 7". The displacement travel of the conveyor ramp 51 in the direction of the arrow 53 is optionally ensured by the conveyor ramp 51, like also the conveyor ramp 11, being in the form of a conveyor, and rolling on the lateral surface with the lateral outlet opening 9 of the load carrier, and in accordance with a further option the conveyor ramp 51 is in the form of a body having a sliding side surface and being displaceable inclinedly downwardly.

As already set forth in relation to the first embodiment, the conveyor ramp 51 is also pivotable between a plurality of operative positions in order to be brought into contact with the load carrier 5 provided on the mount 52.

The method of emptying the load carrier will now be described hereinafter with reference to FIGS. 1 to 6. In accordance with both preferred embodiments of the method, a load carrier 5 is firstly provided. The load carrier 5 is disposed in a non-inclined position which approximately corresponds to position II of FIG. 2. The load carrier positioned in that way is connected to the mount 2, 52 in the region 3 of the apparatus 1, 50 or is moved thereto and coupled to the mount 2, 52 for the further processing steps. Optionally, the conveyor ramp 11, 51 is moved into a position II as shown in FIG. 2, in particular being pivoted, to form contact with the side surface of the load carrier 5.

In this case, the load carrier 5 is either formed from the outset with an open side wall, or it has a closure wall which is removed before being brought into contact with the conveyor ramp 11, 51. The movement of the conveyor ramp 11, 51 into a position which permits it to be brought into contact with the load carrier 5 is also already possible before the load carrier 5 approaches the mount.

In a next step, the load carrier 5 disposed on the mount 2, 52 and the conveyor ramp 11, 51 are moved, in particular pivoted, into a position of being inclined relative to the horizontal (see position I in FIG. 2). Although it is optionally possible for the pivotal movement to be performed separately, it is considered particularly preferable for the pivotal movement to be effected when both parts—the load carrier 5 and the conveyor ramp 11, 51—are already in contact.

When the load carrier 5 with the mount 2, 52 and the conveyor ramp 11, 51 are in the inclined position relative to the horizontal, a relative movement is produced between the mount 2, 52 and the conveyor ramp 11, 51. That is effected either in accordance with the first embodiment by the mount 2 being displaced with the load carrier 5, or by the conveyor ramp 51 being displaced relative to the mount 52 and the load carrier 5 in accordance with the second embodiment. In accordance with a third preferred alternative, the two movements are combined. In a relative movement in accordance with the second embodiment, the conveyor ramp 51 is preferably lowered in the direction of a lower opening 101 in the region of the ground 100.

By virtue of the relative movement produced between the mount 2, 52 and the conveyor ramp 11, 51, the lateral outlet opening 9 or a region thereof is progressively opened for the conveyor ramp 11, 51, that is to say it is no longer covered thereby. In that way, firstly the packages 7 which are at the top in the load carrier 5 are released to pass through the lateral outlet opening 9 and to reach the conveyor 21, 61, optionally by way of a collecting rocker 19, 59, the packages 7 then being carried away for further processing by the conveyor 21, 61. Following complete emptying of the load carrier 5, the direction of movement of the mount 2, 52 and the conveyor ramp 11, 51 relative to each other is reversed, the load carrier 5 and the mount 2, 52 with the region 3 are moved downwardly again and are moved back into the original position so that the load carrier 5 can be removed and a fresh load carrier 5 can be fitted.

Figure 7:
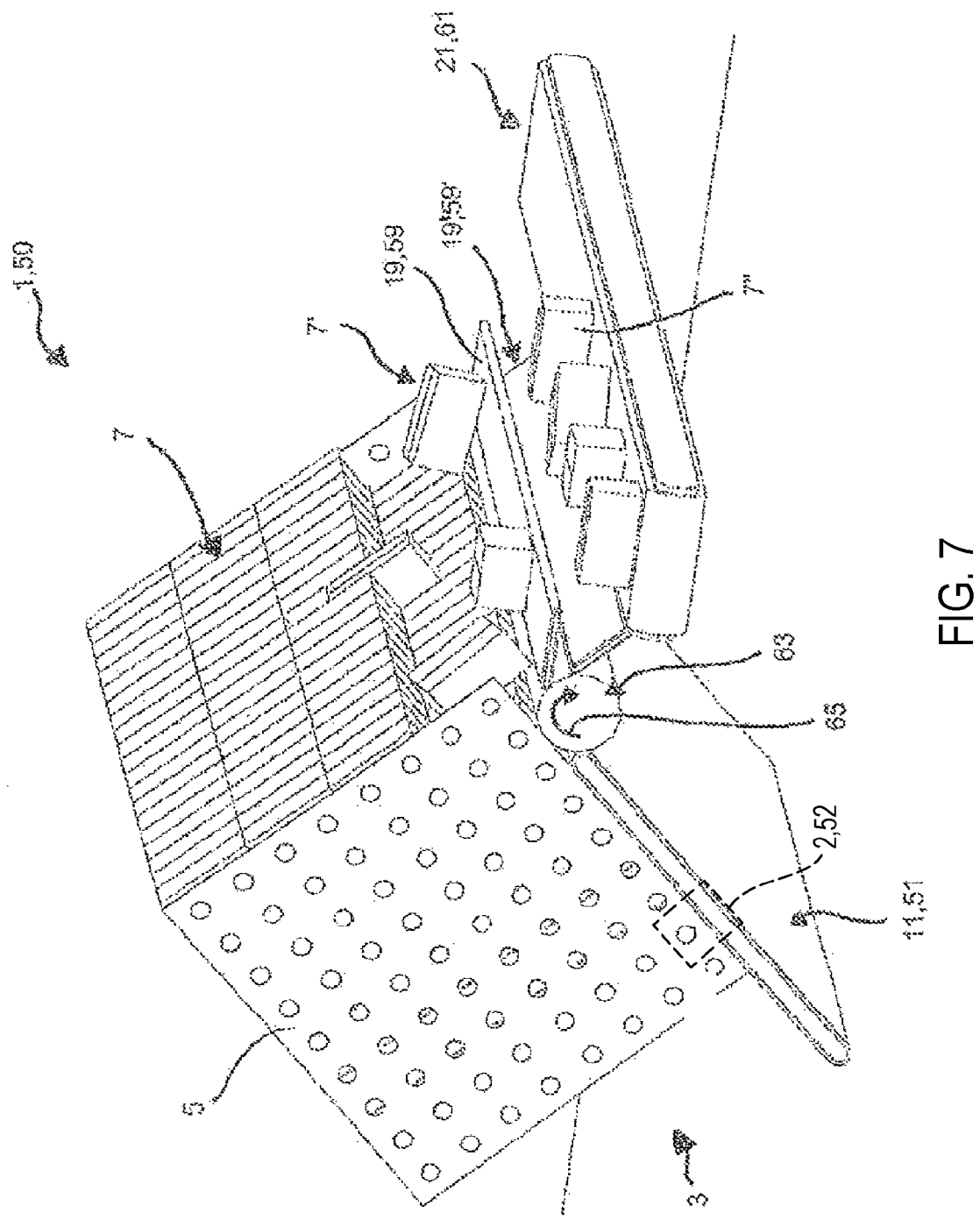
FIG. 7 shows a perspective view of a preferred development of the apparatuses in accordance with first and second embodiments.

FIG. 7 shows a diagrammatic simplified view of the apparatus according to the invention in accordance with the first and second embodiments. The aspect of the relative movement, which has been described in the preceding Figures, is omitted here for the sake of improved clarity. The apparatus 1, 50 shown in FIG. 7 differs from the embodiments shown in FIGS. 1 to 6 essentially in that there is provided a conveyor roller 63. The conveyor roller 63 is arranged between the conveyor ramp 11, 51 at its upper end and the collecting rocker 19, 59. The conveyor roller 63 is driven in rotation in the direction of the arrow 65. The conveyor roller 63 is driven at a rotary speed which on the roller surface leads to a belt speed equal to or greater than the belt speed of the conveyor ramp 11, 51. That provides that the articles bearing against the conveyor roller 63 are discharged at an accelerated speed out of the interior of the load carrier 5 in the direction of the conveyor 21, 61. Preferably the belt speed of the surface of the conveyor roller 63 is higher than the belt speed of the conveyor ramp 11, 51.

Figure 8:
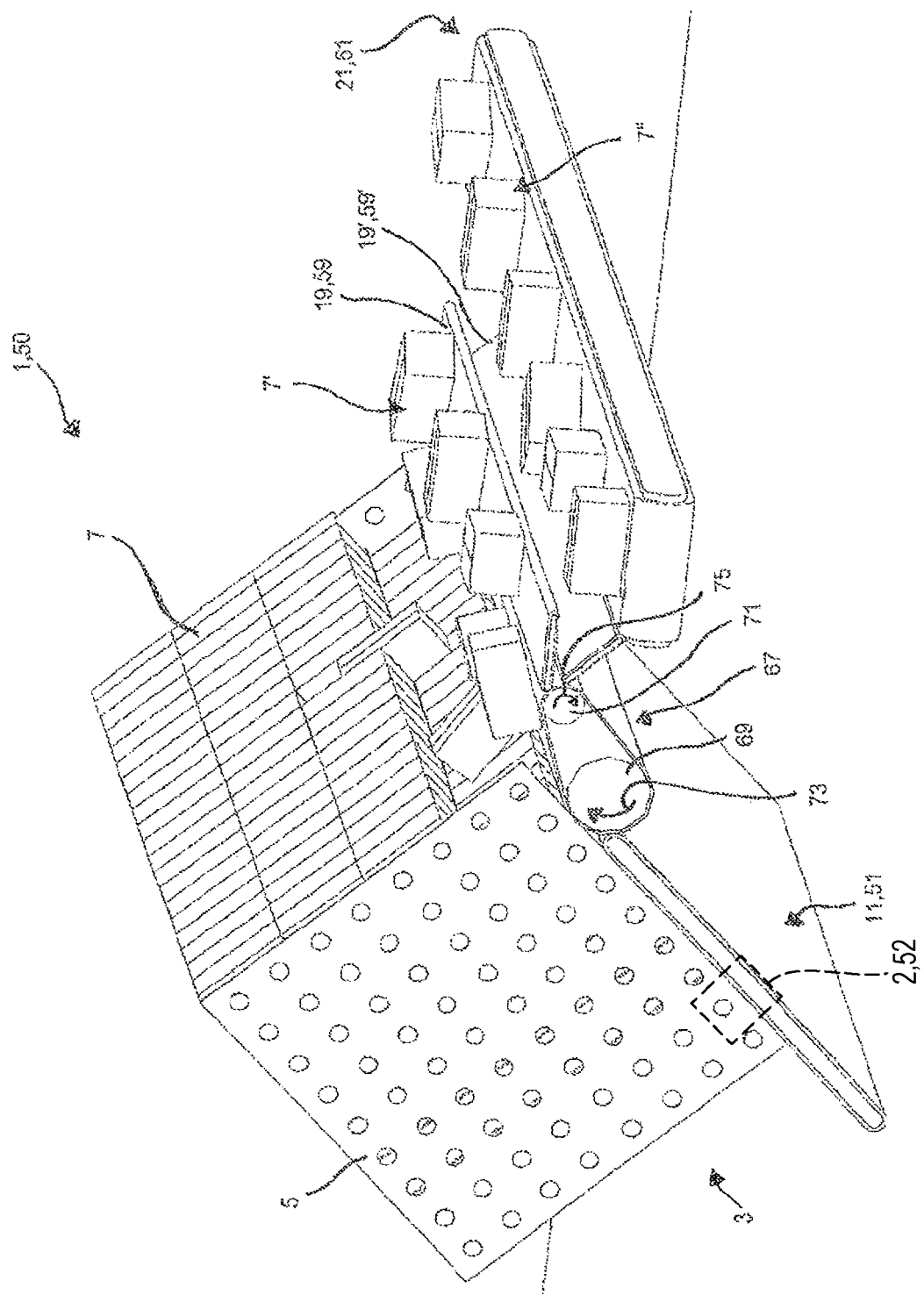
FIG. 8 shows a perspective view of a further preferred development of the apparatuses according to first and second embodiments.

It can additionally be seen from FIGS. 7 and 8 that the collecting rocker 19, 59 can be pivoted from a substantially horizontal orientation into a position of being inclined in the direction of the conveyor 21, 61 for carrying the articles away, as indicated by references 19', 59'.

FIG. 8 shows a further embodiment of the apparatus 1, 50 according to the invention. The apparatus is structurally similar to the apparatus shown in FIG. 7, but it differs therefrom in particular in that there is provided not an individual conveyor roller 63 (FIG. 7), but a conveyor belt 67 for deflecting the articles and carrying them out of the load carrier 5. The conveyor belt 67 is arranged between the conveyor ramp 11, 51 at its upper end and the collecting rocker 19, 59 or the conveyor 21, 61 for carrying the articles away. The conveyor belt 67 is arranged, preferably in a tensioned condition, for circulation around a first roller 69 and a second roller 71. The first and/or second roller 69, 71 is driven in the direction of the arrows 73, 75 at a rotary speed which produces a belt speed of the conveyor belt 67, which is equal to the belt speed of the conveyor ramp 11, 51 or exceeds same. Preferably, the belt speed of the conveyor belt 67 is higher than the belt speed of the conveyor ramp 11, 51, more specifically in consideration of the consequences already described in respect of the conveyor roller 63 in FIG. 7. In this embodiment, by virtue of the larger contact area of the articles on the conveyor belt in comparison with the conveyor roller, discharge of the articles in the direction of the conveyor 21, 61 is even more effective. The first roller 69 and/or the second roller 71 are preferably adjustable in height so that the angle of the side of the conveyor belt 67, that is towards the articles, is adjustable.

Figure 9:
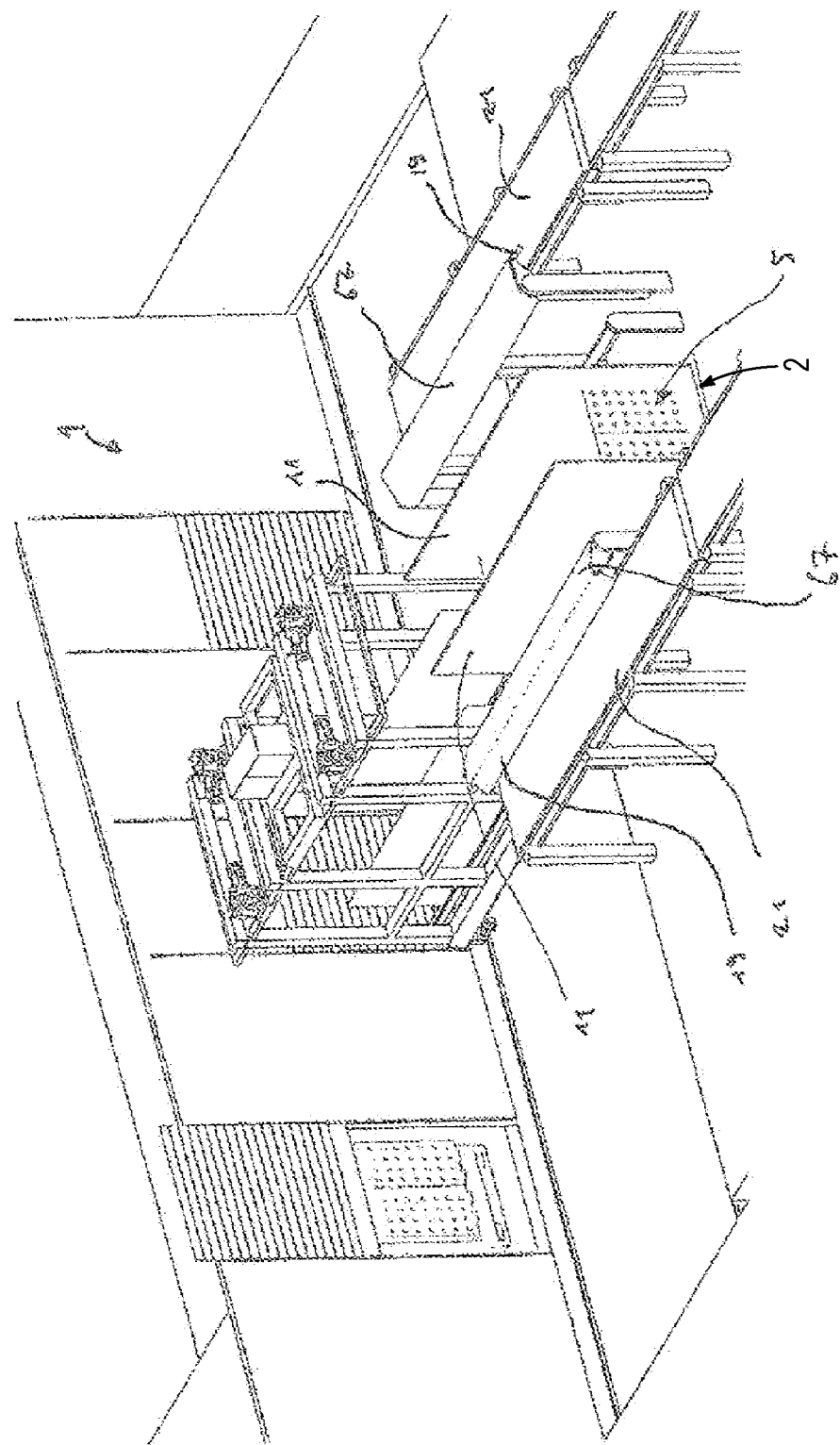
FIG. 9 shows a perspective view of a preferred development of the apparatus according to the invention according to a third embodiment.
Figure 10:
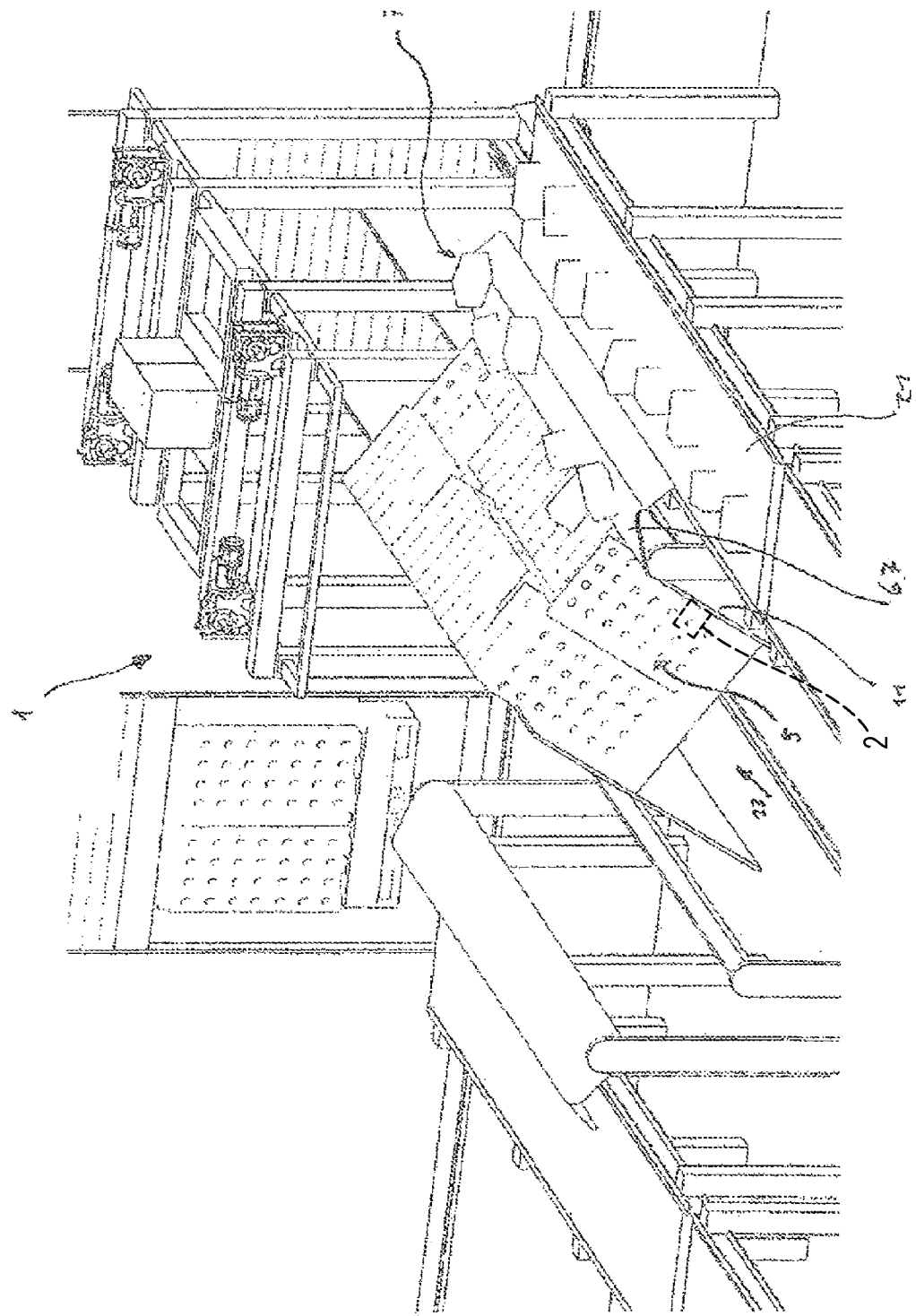
FIG. 10 shows a further perspective view of the apparatus according to the third embodiment.

FIGS. 9 to 11 show a preferred third embodiment of the apparatus according to the invention. In regard to the technical features and structural configuration, this involves substantial conformity with the apparatuses according to the first and second embodiments of the invention and, in particular, there is a similarity with the first embodiment of the invention, in which the mount 2 with the load carrier 5 is moved upwardly relative to the conveyor ramp.

The same or structurally or functionally similar features are therefore denoted in the third embodiment with the same references as described hereinbefore in relation to the first and second embodiments.

The apparatus 1 according to the third embodiment differs from the previously described embodiments, in particular, in that it has a single mount 2 which has at both sides a first and a second conveyor ramp 11 and a first and a second conveyor 21. The mount 2 is adapted to selectively supply the first or second conveyor 21 with articles 7 by bringing same into contact with the respective conveyor ramp 11.

As the structural configuration of the apparatus according to the third embodiment is self-explanatory when considering the description relating to the first and second embodiments, reference is made to FIGS. 9 to 11 to describe in detail in particular the progress of the method according to the third embodiment.

FIG. 9 shows a load carrier 5 within a mount 2 of the apparatus 1 according to the invention. At its ends, the load carrier 5 has respective load surface-delimiting means. At its side surfaces, the load carrier 5 can be brought into contact with two conveyor ramps 11 which function as a first and a second conveyor ramp. Arranged beside the conveyor ramps 11 at both sides are respective conveyor belts 67. The conveyor belts 67 are each drivable.

So that articles can be conveyed out of the load carrier 5 on to a first or second conveyor 21, optionally by means of transfer by way of a rocker 19, the load carrier 5 must be displaced in the direction of one of the two conveyors 21, starting from the condition shown in FIG. 9.

For that purpose, the load carrier together with at least one and preferably both conveyor ramps 11 is moved into an inclined position relative to the horizontal. The load carrier 5 can then be lifted in the inclined position. That is shown in FIG. 10 in which the load carrier 5 is moved in the direction of the arrow 23 towards one of the two conveyor belts 67.

If, for example, the articles are tilted within the load carrier in the upper region in the proximity of the conveyor belt 67, it is possible in accordance with the third embodiment to change the direction in which articles are discharged on to the conveyor belts 21. For that purpose, the load carrier 5 is preferably partially or completely lowered again from the condition shown in FIG. 10, whereby, after being tilted back into the starting position, that restores the condition shown in FIG. 9. Subsequently, the load carrier 5 is preferably moved in the direction of the other conveyor ramp in a position inclined relative to the horizontal and lifted again, as indicated by the arrow 23' in FIG. 11. In that position, the articles 7 which were previously tilted in the position shown in FIG. 10 and which could not move past the articles in front thereof are unloaded without any problem on to the second conveyor 21 which is arranged in mirror-image relationship on the opposite side to the other conveyor 21. In the event of renewed tilting of articles which are further back, the method is repeated in the reverse sequence.

The invention claimed is:

1. An apparatus for emptying a load carrier loaded with articles, the load carrier having a lateral outlet opening for removal of the articles, the apparatus comprising:
    a first mount for coupling the load carrier to the apparatus;
    a first conveyor configured to carry the articles away from the load carrier;
    a first conveyor ramp arranged upstream of the first conveyor and operatively associated with the mount; and
    a conveyor belt arranged between the first conveyor ramp and the first conveyor and confronting an upper end of the first conveyor ramp by extending along the lateral outlet opening, the conveyor belt carried by a first roller and a second roller and being positioned to fully support and transfer the articles from the load carrier in a direction of the first conveyor,
    wherein the first conveyor ramp is configured to be brought into contact with the lateral outlet opening of the load carrier, the first mount and the first conveyor ramp are pivotable into an inclined position with respect to the horizontal and in which first the conveyor ramp is in contact with the outlet opening of the load carrier, and the apparatus is operable to provide relative movement between the first mount and the first conveyor ramp when in the inclined position in such a way that a distance between the first mount and the first conveyor is decreased.

2. The apparatus of claim 1 wherein the load carrier has a second lateral outlet opening in opposite relationship to the first lateral outlet opening, and the apparatus further comprises:
    a second conveyor for carrying the articles away and a second conveyor ramp arranged upstream of the second conveyor, wherein the second conveyor ramp is configured to be brought into contact with the second lateral outlet opening of the load carrier,
    wherein the first mount and the second conveyor ramp are pivotable into a position which is inclined relative to the horizontal and in which the second conveyor ramp is in contact with the second lateral outlet opening of the load carrier, and
    the apparatus is operable to provide relative movement between the first mount and the second conveyor ramp in the inclined position in such a way that a distance between the first mount and the second conveyor is decreased.

3. The apparatus of claim 2 wherein the first mount is arranged between the first conveyor ramp and second conveyor ramp, the first mount being pivotable selectively in the direction of the first conveyor ramp or second conveyor ramp.

4. The apparatus of claim 1 wherein a displaceable portion of the first conveyor ramp provides the relative movement between the first mount and the first conveyor ramp.

5. The apparatus of claim 1 wherein the load carrier is adapted for use in a logistics system for at least one of being transferred on to the load surface of a vehicle or being taken therefrom, and the load carrier is substantially of dimensions adapted to the load surface of the vehicle.

6. The apparatus of claim 1 wherein the first conveyor has one or more conveyor belts or one or more conveyor chutes for carrying the articles away.

7. The apparatus of claim 1 wherein the first conveyor is configured to slow down the articles being carried away.

8. The apparatus of claim 1 wherein the first conveyor is adjustable in at least one of height or angle.

9. The apparatus of claim 1 wherein the first conveyor is adapted to a displacement movement of the first conveyor ramp.

10. The apparatus of claim 1 wherein the conveyor belt is drivable at a higher speed than the relative speed between the first mount and the first conveyor ramp.

11. The apparatus of claim 1 further comprising:
    one or more guide plates arranged above the first conveyor and configured to deflect the articles fed to the conveyor in the conveyor direction.

12. The apparatus of claim 1, wherein the first and second rollers are formed with different diameters.

13. The apparatus of claim 1, wherein at least one of the first roller or the second roller is adjustable in height for adjusting an angle of the conveyor belt relative to the first conveyor ramp.

14. A method of emptying a load carrier loaded with articles, which load carrier has a lateral outlet opening for removal of the articles, the method comprising:
    providing the load carrier in a mount;
    bringing a conveyor ramp and the lateral outlet opening of the load carrier into contact with each other;
    pivoting the mount and the conveyor ramp into an inclined position relative to the horizontal and in which the conveyor ramp is in contact with the lateral outlet opening of the load carrier;
    providing relative movement between the mount and the conveyor ramp in the inclined position in such a way that a distance between the mount and a conveyor arranged downstream of the conveyor ramp is decreased; and
    discharging the articles from the load carrier, which articles pass through the lateral outlet opening which becomes free as a consequence of the relative movement, by a conveyor belt arranged between the conveyor ramp and the conveyor, wherein the conveyor belt is carried by a first roller and a second roller and transfers the articles from the load carrier in the direction of the conveyor.

15. The method of claim 14 wherein the mount is displaced by a drive unit in the inclined position along the conveyor ramp.

16. The method of claim 14 further comprising at least one of:
    driving the conveyor ramp substantially synchronously with the relative movement provided between the mount and the conveyor ramp;
    reciprocating a collecting rocker between a horizontal collecting position and an inclined release position, the collecting rocker arranged between the conveyor ramp and the conveyor for carrying the articles away;
    transporting the load carrier in a horizontal plane to an abutment point and coupling to the conveyor ramp upon attainment of the abutment point;
    slowing down the articles being carried away;
    adjusting at least one of a height or an angle of the conveyor for carrying the articles away, preferably adapted to a displacement movement of the conveyor ramp; or
    driving at least one of the conveyor roller or the conveyor belt at the same or a higher speed than the relative speed between the mount and the conveyor ramp.

17. The method of claim 14 further comprising:
if wedging of the articles is detected, lowering the raised mount which is in contact with the conveyor ramp and which is inclined relative to the horizontal;
bringing a second conveyor ramp and a second lateral outlet opening of the load carrier into contact with each other;
pivoting the mount into an opposite position of being inclined relative to the horizontal; and
raising the mount relative to the second conveyor ramp with which the mount is now in contact.

18. A method of emptying a load carrier loaded with articles, which load carrier has a lateral outlet opening for removal of the articles, the method comprising:
providing the load carrier in a mount;
bringing a conveyor ramp and the lateral outlet opening of the load carrier into contact with each other;
pivoting the mount and the conveyor ramp into an inclined position relative to the horizontal and in which the conveyor ramp is in contact with the lateral outlet opening of the load carrier;
providing relative movement between the mount and the conveyor ramp in the inclined position in such a way that a distance between the mount and a conveyor arranged downstream of the conveyor ramp is decreased;
discharging the articles from the load carrier, which articles pass through the lateral outlet opening which becomes free as a consequence of the relative movement, by a conveyor belt arranged between the conveyor ramp and the conveyor and which transfers the articles from the load carrier in the direction of the conveyor;
if wedging of the articles is detected, lowering the raised mount which is in contact with the conveyor ramp and which is inclined relative to the horizontal;
bringing a second conveyor ramp and a second lateral outlet opening of the load carrier into contact with each other;
pivoting the mount into an opposite position of being inclined relative to the horizontal; and
raising the mount relative to the second conveyor ramp with which the mount is now in contact.

\* \* \* \* \*